United States Patent Office 3,253,028
Patented May 24, 1966

3,253,028
PROCESS FOR PRODUCING ALKANESULFINYL CHLORIDES
Rector P. Louthan, Bartlesville, Okla., assignor to Phillips Petroleum Company, a corporation of Delaware
No Drawing. Filed Aug. 20, 1962, Ser. No. 218,092
4 Claims. (Cl. 260—543)

This invention relates to sulfur-containing organic compounds and to their preparation. In accordance with one aspect, this invention relates to alkanesulfinyl chlorides and alkanesulfinamides and to their preparation. In accordance with another aspect, this invention relates to a low temperature process for the production of alkanesulfinyl chlorides and alkanesulfinamides. In accordance with another aspect, this invention relates to a process for the preparation of alkanesulfinyl chlorides as intermediate reaction products and, without necessarily isolating these compounds from the reaction mass, reacting said intermediate products directly with a nitrogen-containing compound to prepare the corresponding sulfinamides.

This application is a continuation-in-part application of copending application having Serial No. 681,167, filed August 30, 1957, now abandoned.

The preparation and reactions of the alkylsulfur trichlorides are known and have been described to some extent in the prior art, even though these materials are a relatively new class of compounds. Further, it is known that these trichlorides are very unstable and decompose rather rapidly even at ambient temperatures, and due to this instability, the utility of these compounds has been somewhat limited. One reaction of the alkylsulfur trichlorides that has been described in the art is the hydrolysis of these compounds with an excess of the hydrolyzing agent to form sulfinic acids and sulfinates. However, I have found that by reacting the primary and/or secondary alkylsulfur trichlorides under very closely controlled conditions with a reagent having the formula ROH, where R is selected from the group consisting of hydrogen and alkyl radicals that alkanesulfinyl chlorides can be advantageously obtained.

Accordingly, an object of this invention is to provide a method for preparing sulfur-containing organic compounds.

Another object of this invention is to provide a method for preparing alkanesulfinyl chlorides and alkanesulfinamides.

Another object of this invention is to provide a low temperature process for the production of alkanesulfinyl chlorides and alkanesulfinamides.

Another object of this invention is to provide a process for preparing alkanesulfinyl chlorides as intermediate reaction products and, without isolation, reacting said intermediate products directly to provide the corresponding sulfinamides.

Other aspects, objects, as well as the several advantages of this invention, are apparent from a study of the disclosure and the appended claims.

In accordance with the present invention, a process is provided for the preparation of alkanesulfinamides of the formula

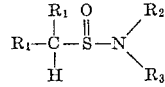

comprising reacting a primary or secondarry alkylsulfur trichloride with an equimolar or equivalent amount of a reagent having the formula ROH, wherein R is selected from hydrogen and alkyl radicals having not more than five carbon atoms, and a nitrogen compound such as ammonia or an amine below the rapid decomposition temperature of the trichloride to form the sulfinamide.

More specifically, a process is provided for the preparation of alkanesulfinyl chlorides comprising reacting primary and/or secondary alkylsulfur trichlorides with a stoichiometric amount of the above characterized reagent such as water and/or an alkyl monohydroxy alcohol at a reaction temperature preferably below about 10° C., more preferably below 0° C., so that decomposition of the alkylsulfur trichloride is minimized during the reaction and, at the same time, a high yield of the alkanesulfinyl chloride can be obtained, and then contacting the reaction mixture thus formed with a nitrogen compound selected from ammonia and primary and secondary amines to form the corresponding sulfinamides.

In accordance with a more specific concept of this invention, a process is provided which comprises reacting under carefully controlled conditions, in a reaction mass, primary and/or secondary alkylsulfur trichlorides having alkyl groups containing from 1–20 carbon atoms, preferably suspended in an inert diluent, with a stoichiometric amout of water and/or an aliphatic, monohydroxy alcohol having from 1–5 carbon atoms at a reaction temperature preferably below about 10° C., more preferably below about 0° C. to form the corresponding alkanesulfinyl chlorides.

The products of the reaction described above are the corresponding alkanesulfinyl chlorides which are quite stable. The sulfinyl chlorides can be recovered from the reaction mass by distillation or by other suitable methods. Alternatively, the reaction mixture containing the alkanesulfinyl chlorides can be used to prepare derivatives which can also be recovered.

The alkanesulfinyl chlorides of the present invention are particularly useful as intermediates for the production of other compounds, such as the amine derivatives which can be used in formulating emulsion polymerization recipes and for compounding rubber. These amine derivatives can be prepared, for example, by the reaction of the sulfinyl chloride and an amine such as the aliphatic amines, and these amine derivatives can be advantageously isolated as the hydrochloride salts.

Thus, in accordance with this invention, primary and/or secondary alkylsulfur trichlorides are reacted with an equivalent amount of a reagent having the characteristic formula of ROH, wherein R is selected from hydrogen and alkyl radicals, at a reaction temperature preferably below about 10° C. to form alkanesulfinyl chlorides, and this principal reaction product can be isolated and reacted, or reacted as a component in the resulting reaction mixture, with at least one nitrogen compound selected from the group consisting of ammonia and primary and secondary amines to form the corresponding sulfinamide as the principal reaction product.

In accordance with another concept of this invention, a process is provided which comprises contacting a dialkyl disulfide, preferably suspended in an inert diluent, with chlorine at a temperature below about 10° C. to form primary and/or secondary alkylsulfur trichlorides, reacting the thus-formed cold reaction mixture with a stoichiometric amount of water and/or an alkyl, monohydroxy alcohol having from 1–5 carbon atoms at a temperature below about 10° C., preferably within the range of —80° C. and 0° C., to form the corresponding sulfinyl chlorides as an intermediate reaction product of the process, and isolating and reacting this intermediate product, or reacting same as a component in the resulting reaction mixture, with at least one nitrogen compound selected from the group consisting of ammonia and primary and secondary amines, and recovering the corresponding sulfinamides as the principal reaction products of the process.

According to the invention, a process is provided for the preparation of alkanesulfinamides of the formula $$R_1-\underset{\underset{H}{|}}{\overset{\overset{R_1}{|}}{C}}-\overset{\overset{O}{\|}}{S}-N\diagup^{R_2}_{R_3}$$

wherein $R_1$ is selected from the group consisting of hydrogen and alkyl groups having up to and including 20 carbon atoms, $R_2$ and $R_3$ are selected from the group consisting of hydrogen and hydrocarbon radicals having from 1–10 carbon atoms selected from alkyl, cycloalkyl, aryl, alkaryl, aralkyl, alkylcycloalkyl, cycloalkylalkyl radicals and $$-\overset{\overset{O}{\|}}{S}-R_1$$

and wherein $R_2$ and $R_3$ can, together with the nitrogen, form a heterocyclic ring, in which case the radical comprising the combined $R_2$ and $R_3$ is selected from the group consisting of —CH$_2$—CH$_2$—CH$_2$—CH$_2$—CH$_2$,
—CH$_2$—CH$_2$—O—CH$_2$—CH$_2$, and
—CH$_2$—CH$_2$—S—CH$_2$—CH$_2$—

Usually, $R_1$, $R_2$ and $R_3$ contain 1 to 10 carbon atoms. Also, the total carbon atoms in $R_1$ or the compound is usually not over 20.

Representative examples of sulfinamides that can be prepared according to the invention are:

Methanesulfinamide;
N,N-dimethyl-sec-octanesulfinamide;
N,N-diethyl-n-heptanesulfinamide;
N,N-diisopropyl-sec-decanesulfinamide;
N,N-dimethyl-n-hexanesulfinamide;
N,N-diethyl-n-pentanesulfinamide;
N,N-di-n-propyl-sec-hexanesulfinamide;
N-methyl-N-ethyl-n-butanesulfinamide;
N,N-di-n-butylmethanesulfinamide;
N,N-di-n-heptyl-methanesulfinamide;
N,N-di-n-hexyl-methanesulfinamide;
N,N-dimethyl-n-butanesulfinamide;
N,N-diethyl-n-butanesulfinamide;
N,N-dimethylethanesulfinamide;
N,N-4-oxapentamethylenemethanesulfinamide;
N,N-pentamethylenemethanesulfinamide;
N,N-di-n-butylethanesulfinamide;
N-cyclohexyl-n-heptanesulfinamide
N,N-diphenylmethanesulfinamide
N-methyl-N-benzylethanesulfinamide
N,N-di-p-tolyl-n-pentanesulfinamide
N,N-di(4-methylcyclohexyl)-n-propanesulfinamide
N,N-di(2-cyclohexylethyl)-n-butanesulfinamide
N,N-di-n-butyl-n-propanesulfinamide;
N,N-di-n-butyl-n-butanesulfinamide;
N,N-di-n-butylisobutanesulfinamide;
N,N-di-n-butyltetradecanesulfinamide;
N,N-di-n-pentyldecanesulfinamide;
N,N-dimethyl-n-hexadecanesulfinamide;
N,N-di-n-butyldodecanesulfinamide;
N-n-decyl-bis(n-decanesulfinamide);
N,N-4-oxapentamethylene-n-decanesulfinamide;
N,N-4-thiapentamethylene-n-decanesulfinamide;
N,N-pentamethylene-n-octanesulfinamide;
N-n-decyl-bis(1-eicosylheneicosanesulfinamide);

and the like.

The primary and secondary alkylsulfur trichlorides that can be used in the practice of the present invention as one of the reactants have the formula $$R-\underset{\underset{H}{|}}{\overset{\overset{R}{|}}{C}}-S-Cl_3$$

where R is hydrogen or an alkyl group having not more than 20 carbon atoms. The alkyl groups in these compounds can be either straight chain or branched chain radicals. Representative alkyl radicals that can be employed in these compounds include methyl, ethyl, propyl, isopropyl, butyl, isobutyl, amyl, pentyl, hexyl, heptyl, dodecyl, octadecyl, eicosyl, etc. The primary and secondary alkylsulfur trichloride compounds are known to be very unstable and, therefore, the solutions or reaction mixtures which contain these compounds should be maintained at a reaction temperature below 10° C., preferably below 0° C., in order to prevent rapid decomposition of the trichloride.

According to this invention, it has been found that these highly reactive unstable primary and secondary alkylsulfur trichlorides can be reacted with stoichiometric amounts of a reagent having the characteristic formula ROH, where R is selected from the group consisting of hydrogen and alkyl radicals having not more than five carbon atoms, such as water and/or alkyl, monohydroxy alcohols, for example, methyl, ethyl, propyl, isopropyl, etc., to yield the corresponding alkanesulfinyl chlorides, and it has been further found, that the reaction can be effected rapidly and efficiently at a reaction temperature below the freezing point of water. In actual practice, alkanesulfinyl chlorides having the formula $$R-\underset{\underset{H}{|}}{\overset{\overset{R}{|}}{C}}-\overset{\overset{O}{\|}}{S}-Cl$$

where R is hydrogen or an alkyl group of not more than 20 carbon atoms such as set forth above, are preferably prepared by reacting water, alcohol, or a mixture of the two, equivalent to the primary and/or secondary alkylsulfur trichloride in order to effect the reaction CH$_3$SCl$_3$+H$_2$O→CH$_3$SOCl+2HCl or CH$_3$SCl$_3$+CH$_3$OH→CH$_3$SOCl+CH$_3$Cl+HCl In carrying out the above reactions, excess water and/or alcohol, i.e., more than one mol per mol of sulfur trichloride, is avoided in order to obtain a high yield of alkanesulfinyl chloride and to decrease the yield of secondary products of the reaction such as the corresponding sulfinic acids.

Ordinarily, the modus operandi preferred will be the gradual addition of water and/or alcohol to the alkylsulfur trichloride in a batchwise operation. In operating batchwise, the water and/or alcohol can be added to the alkylsulfur trichloride gradually and in an amount not to exceed one mol of water and/or alcohol per mol of trichloride. If desired, the reaction can also be carried out in a continuous manner, for example, in a tubular reactor. In either batchwise or continuous operation it will be necessary to provide adequate means to cool the reaction mixture and maintain it at the desired temperature as set out above. Further, the rate of addition of water and/or alcohol to the reaction mass will usually not exceed the rate at which the water and/or alcohol is substantially completely reacted with the alkylsulfur trichloride as it is added. As previously pointed out, an excess of water and/or alcohol in the reaction mass causes undesirable secondary products such as the sulfinic acids.

By "reacting" herein and in the claims is meant that reaction conditions are arranged with respect to proportions of reactants and other conditions to obtain an appreciable proportion of the product, i.e., the alkanesulfinyl chloride, as a result of an equimolar reaction of the water and/or the alcohol with the primary and/or secondary alkylsulfur trichloride.

It is generally advantageous, although not required, to conduct the reaction in the presence of a solvent or diluent inert chemically to the reaction mixture and liquid under reaction conditions. Inert solvents or diluents that can be satisfactorily employed in the practice of my invention include the paraffin hydrocarbons such as the low boiling, normally liquid paraffins. For example, normal pentane, isopentane or normal hexane are chemically inert as well as having a low freezing point and a low boiling point, the latter characteristic rendering them easily removable from the reaction product by fractionation. Higher boiling paraffins can be employed, if desired, but if they are to be separated from the product by fractionation they should have a boiling point substantially above or below the boiling point of the product. However, in some instances it may be desirable to separate the product from the reaction mixture by crystallization or solvent extraction. While it is generally preferred to employ a single hydrocarbon as a solvent, mixtures of hydrocarbons can be employed. For example, suitable cuts or fractions of natural gasoline, or any other suitable paraffin mixture, which is free from objectional impurities can be used.

Instead of paraffin hydrocarbons, other organic solvents or diluents can be employed in my process. Among these solvents are the chlorinated hydrocarbons such as, chloroform, carbon tetrachloride, ethylene dichloride, etc. In some instances, the use of halogenated solvents may tend to reduce the yield of the desired product, and in such instances, these solvents are less desirable than the paraffin hydrocarbon diluents hereinbefore described.

As previously pointed out, it is preferred to react a stoichiometric or equimolar proportion of water and/or alcohol, or a mixture of water and alcohol, with primary and/or secondary alkylsulfur trichlorides to form the corresponding alkanesulfinyl chlorides. Alcohols, or aqueous solutions of these alcohols, that can be employed in the practice of the present invention, preferably comprise the alkyl, monohydroxy alcohols having from 1–5 carbon atoms. Preferred alcohols that can be employed include methyl, ethyl, propyl, isopropyl, butyl, isobutyl, and pentyl alcohols.

The primary and secondary alkylsulfur trichlorides that can be employed in the practice of the invention may be prepared in any convenient manner disclosed in the prior art. In accordance with one convenient method of preparing the trichlorides, dialkyl disulfides are chlorinated to give the corresponding alkylsulfur trichlorides. The chlorination of these disulfides can be effected conveniently in solution. Suitable inert solvents or diluents that can be employed include the normal and isoparaffin hydrocarbons such as propane, butane, isobutane, pentane, hexane, heptane and the like. The concentration of dialkyl disulfides employed in the reaction solution can be varied over a relatively wide range; however, in order to obtain a desirable fluid system, concentrations of disulfide less than about 15 weight percent of the solution is generally preferred. The temperature of the reaction mixture is preferably kept sufficiently low so that rapid decomposition of the normal or secondary alkylsulfur trichloride formed is avoided. In general, this temperature depends on the alkyl group in the molecule. Reaction temperatures below about 10° C., and more preferably, temperatures ranging between −80° C. and 0° C. are preferred.

During the chlorination reaction, the alkylsulfur trichlorides may precipitate from the reaction mixture as the reaction proceeds. Essentially complete conversion of the disulfide to the corresponding trichloride can be achieved by the reaction of three mols of chlorine gas for each mol of the disulfide. The reaction can be completed rapidly, that is, in a matter of a few minutes or within an hour, at temperatures within the range of −80° C. to 0° C. It should be realized that the reaction can be carried out in any conventional manner; however, since the reaction is commonly conducted by introducing chlorine gas below the surface of the solution of disulfide, the termination of the reaction can be noted by the fact that the gas is no longer consumed, or that the pressure in a closed reaction vessel increases to the pressure of the chlorine source. The trichlorides can also be formed in a manner similar to the above-described procedure by chlorinating suitable mercaptans.

The cold reaction mixture obtained from the chlorination reaction containing primary and/or secondary alkylsulfur trichlorides can be conveniently reacted directly with a stoichiometric amount of water and/or alcohol to form the corresponding alkanesulfinyl chlorides. The water or alcohol can also be pre-cooled to assist with maintaining the desired low temperature of the reaction mixture. As previously pointed out, an excess of water and/or alcohol is avoided in order to decrease and substantially eliminate the yield of secondary products of the reaction such as the corresponding sulfinic acids, thereby obtaining a high yield of the desired sulfinyl chlorides. Reaction between the water and/or the alcohol and primary and/or secondary alkylsulfur trichlorides is accompanied by evolution of hydrogen chloride, which can be recovered, if desired, and the disappearance of the solid phase, if present, comprising the alkylsulfur trichloride.

The pressure of the reaction is ordinarily maintained at substantially atmospheric, but higher or lower pressures can be employed. For example, if butane or propane is used as the solvent or diluent, the pressure should be sufficiently high to maintain it in the liquid state.

As can be noted from the foregoing description of the invention, it has been discovered that it is possible to obtain high yields of alkanesulfinyl chlorides if primary and/or secondary alkylsulfur trichlorides and water and/or an aliphatic alcohol having from 1–5 carbon atoms are caused to interact in an amount not to exceed equivalent proportions of said water and/or alcohol at a temperature below about 10° C. The preferred ratio to employ in such a reaction is an equimolar ratio of reactants. Of course, if less water and/or alcohol, for example, is passed into the reaction mass than is molecularly equivalent to the alkylsulfur trichlorides employed, then the yield may be reduced to some extent. The invention is not limited to any particular modus operandi for obtaining the desired product. However, an excess of water and/or alcohol in the reaction mass is not desired and should be avoided in order to decrease the yield of secondary products of the reaction such as the corresponding sulfinic acids and, in order to avoid the formation of said sulfinic acids, equivalent amounts of reactants, or an amount of reactants not to exceed equimolar proportions, should be employed.

As stated previously, the alkanesulfinyl chlorides in accordance with my invention are useful as intermediates for the production of other chemical compounds, particularly, by amination to produce sulfinamides. When it is desired to produce other compounds, such as sulfinamides, the reaction of the ammonia or amine with the alkanesulfinyl chlorides can be effected without separating the alkanesulfinyl chlorides from the reaction mixture resulting from the reaction between the alkylsulfur trichlorides and water and/or alcohol. If desired, however, the alkanesulfinyl chlorides can be recovered in any suitable manner from the reaction mixture prior to use in an amidation reaction.

To effect the amidation of the alkanesulfinyl chlorides formed first by the reaction between primary and/or secondary alkylsulfur trichloride and an equivalent amount of water and/or alcohol at a reduced temperature as described herein, the alkanesulfinyl chloride is ordinarily reacted with ammonia or with a primary or secondary amine by adding the ammonia or amine to the reaction mixture resulting from the first reaction. This eliminates the expense and inconvenience of isolating or purifying the alkanesulfinyl chloride. In some cases, though, it may be desirable to add the reaction mixture containing the alkanesulfinyl chlorides to the amine. When reacting primary and/or secondary alkanesulfinyl chlorides with aqueous amine solutions, it is preferred to add the alkanesulfinyl chloride solution to the amine, in order to obtain the highest possible yield. Instead of completing the formation of the alkanesulfinyl chloride before reacting with the ammonia or amine, the latter can be introduced during the step of forming the alkanesulfinyl chloride or, if desired, can be admixed with the primary and/or secondary alkylsulfur trichlorides and solvent, if employed before the introduction of the water and/or alcohol is begun.

Ammonia or primary or secondary amines can be employed in the amidation reaction. Any primary or secondary amine containing from 1-10 carbon atoms can be employed. Alkyl, cycloalkyl, alkylcycloalkyl, cycloalkylalkyl, aryl, alkaryl, and aralkyl amines are suitable, examples of these being aniline; toluidine; alpha-naphthylamine; beta naphthylamine; N-methylaniline; benzylamine; morpholine; aliphatic amines such as methyl, ethyl, propyl, butyl and higher amines; dimethyl, diethyl, methylethylamine; dipropyl, dibutyl, and higher dialkyl amines, cyclohexylamine, 2-methylcyclohexylamine, etc.

The amine can be introduced in any suitable manner to the solution with which it is to be reacted. For example, it can be added as such either in solid form, as a gas, or where suitable, in the liquid state, or it can be added as an aqueous solution or as a solution in a suitable solvent or diluent. The amount of ammonia or of primary or secondary amine employed can vary within rather wide limits. Ordinarily, it is preferred to use a stoichiometric excess of ammonia or amine over the alkanesulfinyl chloride. For example, 2-4 mols of ammonia or the amine can be employed per mol of the alkanesulfinyl chloride; however, ratios outside of this range can be satisfactorily employed.

Following the amidation reaction, the amide can be separated from the resulting reaction mixture in any suitable manner. The excess ammonia or amine can also be removed in any suitable way, for example, by water washing where the amine is water soluble. The reaction mixture, free of excess ammonia or amine, can then be evaporated to remove the solvent, for example. Preferably, the solvent removal is done in vacuum in order to minimize decomposition. The amide can be recovered from the final reaction mixture by extraction for example, with chloroform, or other suitable amide solvents.

The following specific examples are illustrative of the invention.

EXAMPLE I

This example demonstrates the operability of the various steps of the present invention in the production of sulfinamides, wherein a dialkyl disulfide is chlorinated at a very low temperature to form the unstable alkylsulfur trichloride which in turn was also reacted at a low temperature with methanol to form the alkanesulfinyl chloride, and the alkanesulfinyl chloride was then reacted with an amine to form the sulfinamide.

N,N-di-n-butylmethanesulfinamide was prepared by first preparing and isolating the methanesulfinyl chloride using methanol as a reactant and subsequently reacting the methanesulfinyl chloride with di-n-butylamine. In this run the materials employed for the preparation of the alkanesulfinyl chloride were as follows:

Dimethyl disulfide _____ g__ 188
n-Pentane _____ ml__ 3000
Chlorine (5% excess) _____ g__ 447
Methanol _____ g__ 128

The disulfide and pentane were charged to a 5-liter, 3-necked flask and the contents cooled to about −60° C. using a Dry Ice-acetone bath. Chlorine was added over a 45 minutes period, nitrogen being bled into the flask during the chlorination. At the end of the chlorination, the methanol was added over a period of about 10 minutes. The temperature rose gradually to about 0° C. at which point most of the solid had disappeared. Stirring was continued for about thirty minutes at which time a single phase was present. Most of the solvent was then stripped by heating at 60° C. at atmospheric pressure. The product was then distilled under reduced pressure. The conditions during distillation and refractive indices of the fractions are summarized in Table I.

Table I

DISTILLATION OF METHANESULFINYL CHLORIDE

| Cut No. | Temperature, °C. | | Reflux Ratio | Pressure, mm. | Overhead, g. | Refractive Index, $n_D^{20}$ |
|---|---|---|---|---|---|---|
| | Kettle | Head | | | | |
| 1 | 67 | 55 | 5/1 | 50 | | |
| 2 | 67 | 60 | 5/1 | 50 | 13.8 | 1.5104 |
| 3 | 67.5 | 60.5 | 5/1 | 50 | 13.8 | 1.5103 |
| 4 | 67.5 | 60.5 | 5/1 | 50 | 13.8 | 1.5094 |
| | 88 | 70.0 | 5/1 | 50 | 245.7 | 1.5060 |

For the preparation of N,N-di-n-butylmethanesulfinamide, the following materials were used:

Di-n-butylamine _____ g__ 258
Diethyl ether _____ ml__ 1000
Methanesulfinyl chloride (cuts 1-4 of Table II)
_____ g__ 98.5

The amine and ether were charged as a solution to a 2-liter, 3-necked flask fitted with a Dry Ice-cooled condenser, stirrer, and dropping funnel. The methanesulfinyl chloride was added from the dropping funnel over a ten minute period. The reaction was quite vigorous as indicated by rapid refluxing of the solution. A white crystalline solid, di-n-butylamine hydrochloride, precipitated during the addition. After stirring a few minutes the reaction mixture was filtered. The solid residue was washed with ether, the washings being added to filtrate. Ether was then stripped by heating to 60° C. at aspirator pressure to obtain 232.7 grams of yellow oil. This oil was diluted with one liter of n-pentane and washed with water. The oil phase was stripped to remove solvent and distilled at reduced pressure. The conditions during distillation and refractive indices of the fractions are summarized in Table II.

Table II

DISTILLATION OF N,N-DI-n-BUTYLMETHANESULFINAMIDE

| Cut No. | Temperature, °C. | | Reflux Ratio | Pressure, mm. | Overhead, g. | Refractive Index, $n_D^{20}$ |
|---|---|---|---|---|---|---|
| | Kettle | Head | | | | |
| 1 | 111 | 35 | 5/1 | 1.2 | | |
| 2 | 112 | 92.5 | 5/1 | 0.8 | 8.9 | 1.4509 |
| 3 | 114 | 92.0 | 5/1 | 0.7 | 14.0 | 1.4645 |
| 4 | 114 | 90.0 | 5/1 | 0.35 | 23.3 | 1.4656 |
| 5 | 119 | 89.0 | 5/1 | 0.20 | 106.2 | 1.4652 |
| | 147 | [1] 100 | 5/1 | 1.2 | 9.2 | 1.4659 |

[1] Decomposition occurring.

Analysis of Cut. No. 3:

| | Calculated for $C_9H_{21}NOS$ | Found |
|---|---|---|
| Carbon | 56.5 | 55.6 |
| Hydrogen | 11.0 | 10.9 |
| Oxygen | 8.4 | |
| Nitrogen | 7.3 | 7.0 |
| Sulfur | 16.8 | 17.2 |

EXAMPLE II

For the preparation of other sulfinamides, methanesulfinyl chloride was first prepared using the following materials:

Dimethyl disulfide _____ g__ 235
Chloroform _____ ml__ 3500
Chlorine _____ g__ 558
Methanol _____ g__ 160

The procedure employed was substantially the same as described above in Example I except that the solvent was stripped at atmospheric pressure through a packed column by heating to 118° C. After stripping, distillation was continued according to the schedule in Table III.

*Table III*

| Cut No. | Temperature, °C. | | Reflux Ratio | Pressure, mm. | Overhead, g. | Refractive Index, $n_D^{20}$ |
|---|---|---|---|---|---|---|
| | Kettle | Head | | | | |
| 1 | 56 67 | 48 59.5 | 5/1 | 50 50 | 13.2 | 1.5021 |
| 2 | 67.5 | 60.5 | 5/1 | 50 | 13.5 | 1.5055 |
| 3 | 106 | 70 | 1/1 | 50 | 351.1 | 1.5008 |

Cuts 1, 2, and 3 were combined and used in the following runs (Examples III, IV, V, and VI) for the preparation of various sulfinamides.

EXAMPLE III

N,N-di-n-butylmethanesulfinamide was prepared using the following materials:

Methanesulfinyl chloride _____ g__ 246
Ether _____ ml__ 2500
Di-n-butylamine _____ g__ 646

The procedure employed was the same as that shown above in Example I except that the di-n-butylamine hydrochloride was washed from the solution with water. Solvent was stripped by heating to 70° C. at aspirator pressure. The product was subjected to an initial distillation from which all cuts taken overhead were combined and redistilled under reduced pressure. The conditions during distillation and refractive indices of the fractions are summarized in Table IV.

*Table IV*

| Cut No. | Temperature, °C. | | Reflux Ratio | Pressure, mm. | Overhead, g. | Refractive Index, $n_D^{20}$ |
|---|---|---|---|---|---|---|
| | Kettle | Head | | | | |
| 1 | 78 96 | 34 28 | 5/1 | 1.8 0.9 | 19 | |
| 2 | 108 | 32 | 5/1 | 1.25 | 4.8 | 1.4558 |
| 3 | 115 | 85 | 5/1 | .7 | 9.1 | 1.4651 |
| 4 | 113.5 | 88 | 5/1 | .7 | 9.1 | 1.4760 |
| 5 | 122 | 95 | 1/1 | .4 | 200.4 | 1.4652 |

EXAMPLE IV

N,N-di-n-heptylmethanesulfinamide was prepared using the following materials:

Di-n-heptylamine _____ g__ 107
Ether _____ ml__ 500
NaOH (40% aqueous) _____ g__ 55
Methanesulfinyl chloride _____ g__ 50

The amine, ether, and sodium hydroxide were charged to the reaction flask and the alkanesulfinyl chloride added dropwise over a period of about 20 minutes. Some solid precipitate was formed during the reaction which failed to go into solution when additional water was added. Most of the water was removed and the oil phase diluted to about 1700 ml. with n-heptane, cooled to −50° C. and filtered to remove precipitated solids. The solid was washed with n-heptane and washings added to the filtrate. After stripping n-heptane, the product was distilled under reduced pressure. The conditions during distillation and refractive indices of other fractions are summarized in Table V.

*Table V*

DISTILLATION OF N,N-DI-n-HEPTYLMETHANESULFINAMIDE

| Cut No. | Temperature, °C. | | Reflux Ratio | Pressure, mm. | Overhead, g. | Refractive Index, $n_D^{20}$ |
|---|---|---|---|---|---|---|
| | Kettle | Head | | | | |
| 1 | 151 156 | 95 95 | 5/1 | 0.3 0.3 | 6.1 | 1.4420 |
| 2 | 172 | 106 | 5/1 | 1.25 | 3.8 | 1.4487 |
| 3 | 168 | 105 | 5/1 | 1.25 | 3.8 | 1.4438 |
| 4 | 156.5 | 100 | 5/1 | 0.7 | 3.8 | 1.4498 |
| 5 | 153 | 93 | 5/1 | 0.4 | 4.0 | 1.4461 |

EXAMPLE V

N,N-di-n-hexylmethanesulfinamide was prepared using the following materials:

Di-n-hexylamine _____ g__ 282
n-Heptane _____ ml__ 750
Methanesulfinyl chloride _____ g__ 75

The same procedure was followed as described above in Example IV. After the amine hydrochloride was removed on a filter, the oil phase was water washed and distilled. Cuts from a preliminary distillation were combined and redistilled under reduced pressure. The conditions for distillation and refractive indices of the fractions are summarized in Table VI.

*Table VI*

DISTILLATION OF N,N-DI-n-HEXYLMETHANESULFINAMIDE

| Cut No. | Temperature, °C. | | Reflux Ratio | Pressure, mm. | Overhead, g. | Refractive Index, $n_D^{20}$ |
|---|---|---|---|---|---|---|
| | Kettle | Head | | | | |
| 1 | 110 118.5 | 61 63.5 | 5/1 | 0.45 0.20 | 9.0 | 1.4435 |
| 2 | 140.0 | 77 | 5/1 | 0.50 | 7.6 | 1.4415 |
| 3 | 143.0 | 100 | 1/1 | 0.30 | 16.7 | 1.4495 |
| 4 | 166.0 | 115 | 1/1 | 0.80 | 17.1 | 1.4534 |
| 5 | 215.0 | 145 | 1/1 | 0.80 | | |

[Cuts 3, 4, and 5 combined and redistilled]

| | | | | | | |
|---|---|---|---|---|---|---|
| 1 | 97 102 | 67.0 64.0 | 5/1 | 0.5 0.25 | 9.2 | 1.4414 |
| 2 | 107 | 66.5 | 5/1 | 0.20 | 8.8 | 1.4408 |
| 3 | 113 | 69.0 | 5/1 | 0.20 | 8.5 | 1.4400 |
| 4 | 122 | 71.0 | 5/1 | 0.25 | 7.5 | 1.4381 |
| 5 | 132 | 73.0 | 5/1 | 0.35 | 7.7 | 1.4392 |
| 6 | 135 | 75.0 | 5/1 | 0.35 | 8.3 | 1.4473 |
| 7 | 136 | 83.5 | 5/1 | 0.15 | 8.4 | 1.4518 |
| 8 | 140 | 83.5 | 5/1 | 0.15 | 8.7 | 1.4530 |
| 9 | 146 | 80.5 | 5/1 | 0.15 | 8.7 | 1.4535 |

EXAMPLE VI

In another run, using methanesulfinyl chloride prepared similarly to that described above in Example II, N,N-4-oxapentamethylenemethanesulfinamide was prepared. Charge materials were the following:

Morpholine _____ g__ 139
n-Pentane _____ ml__ 1500
Methanesulfinyl chloride _____ g__ 80

The reaction was as shown above, amine hydrochloride being washed from the reaction mixture with water (about 250 ml.). The aqueous phase (including wash water) was extracted with 750 ml. chloroform and again with 250 ml. chloroform. The chloroform extracts were combined, solvent stripped from the mixture and the product distilled. The conditions during distillation and refractive indices of the fractions are summarized in Table VII

Table VII

DISTILLATION OF N,N-4-OXAPENTAMETHYLENE-METHANESULFINAMIDE

| Cut No. | Temperature, °C. | | Reflux Ratio | Pressure, mm. | Overhead, g. | Refractive Index, $n_D^{20}$ |
|---|---|---|---|---|---|---|
| | Kettle | Head | | | | |
| 1 | 114 | 93.5 | | 0.25 | | |
|   | 112 | 90.0 | 5/1 | 0.15 | 11.8 | 1.5092 |
| 2 | 123 | 92.0 | 5/1 | 0.25 | 11.7 | 1.5102 |
| 3 | 128 | 94.0 | 5/1 | 0.25 | 11.8 | 1.5100 |
| 4 | 154 | 109.0 | 5/1 | 0.60 | 11.9 | 1.5083 |

Analysis of this product for nitrogen and sulfur gave the following values:

| | Calculated for $C_5H_{11}NO_2S$ | Found |
|---|---|---|
| Nitrogen | 9.4 | 8.8 |
| Sulfur | 21.5 | 22.2 |

In a similar manner, N,N-pentamethylenemethanesulfinamide was prepared using piperidine as the amine. Heart cuts from the distillation boiled at 92–94° C. under 0.15 mm. pressure and had a refractive index of 1.5062–1.5065. Nitrogen and sulfur analyses were 11.9 and 20.7 percent, respectively, as compared with calculated values of 9.5 and 21.8.

EXAMPLE VII

A solution containing ethylsulfur trichloride was prepared in the following manner. A three-liter, three-necked flask was equipped with a stirrer, thermometer, and a chlorine inlet bubbler. Provision was made for control of the temperature by immersion in a Dry-Ice-acetone bath.

The reaction vessel was charged with 1600 ml. of n-pentane and 122 grams (1 mol) of diethyl disulfide. The solution was cooled to about −40° C. Chlorine was bubbled into the solution while maintaining the temperature between −30° C. and −50° C. Over a ten minute period, 213 grams (3 mols) of chlorine was introduced. As the reaction proceeded, the solid ethylsulfur trichloride precipitated.

After the chlorine was introduced, the temperature of the mixture was raised to about −20° C. Then water (36 ml. or 2 mols) was added dropwise to the mixture. While the water was added hydrogen chloride was liberated and the temperature dropped to about −28° C. although there was no external cooling of the mixture. The solid phase disappeared gradually as the water was added. After the water had been added, the reaction mixture was warmed to about 20° C. and the hydrogen chloride was vented at atmospheric pressure.

All of the ethanesulfinyl chloride solution was added to 500 grams of an aqueous solution containing 36.4 weight percent of dimethylamine at about 10° C. After stirring the mixture the phases were separated. The water phase was mixed with chloroform (500 ml.) to extract the product, N,N-dimethylethanesulfinamide. The chloroform was stripped off by heating to 65° C. under reduced pressure (about 50 mm.). The liquid product was distilled under reduced pressure. The conditions during distillation and refractive indices of the fractions are summarized in Table VIII.

Table VIII

| Cut No. | Temperature, °C., Head | Pressure, mm. | Overhead, g. | Refractive Index, $n_D^{20}$ |
|---|---|---|---|---|
| 1 | 62.5 | 5 | 10.3 | 1.4675 |
| 2 | 62 | 5 | 100.5 | 1.4688 |
| 3 | 71 | 5 | 7.4 | 1.4718 |
| 4 | 88 | 5 | 6.5 | 1.4764 |

This example demonstrates the steps of chlorinating a dialkyl disulfide to form the alkylsulfur trichloride at a low reaction temperature, and reacting the trichloride with water also at a low temperature to form the alkanesulfinyl chloride, which is then reacted with an amine to form the corresponding sulfinamide.

EXAMPLE VIII

This example shows the preparation of N,N-dimethyl-n-butanesulfinamide employing the steps of chlorinating di-n-butyl disulfide and reacting the alkylsulfur trichloride formed with water to form the corresponding alkanesulfinyl chloride, and then reacting this reaction mixture with an amine to form the sulfinamide. The materials employed in the preparation of the sulfinamide were as follows:

| | | |
|---|---|---|
| Di-n-butyl disulfide | g | 178 |
| n-Pentane | ml | 1600 |
| Chlorine (10% excess) | g | 234 |
| Water | ml | 36 |
| Dimethylamine (36.4% aqueous solution) | ml | 500 |

The disulfide was dissolved in the pentane in a 3-liter, 3-necked flask. The chlorine was introduced over a ten minute period (approximately) while the temperature was maintained in the range −50 to −30° C. After the addition of chlorine and with the temperature at −40° C., the water was added and the temperature allowed to rise to −20° C. Hydrogen chloride was liberated rapidly at this temperature as the solid n-butyl sulfur trichloride disappeared. The reaction mixture was then warmed to 30° C. and added to the dimethylamine solution temperature about 10° C.).

From this reaction mixture, the oil phase was removed and washed with about 300 ml. water, the washings being combined with the aqueous phase. The combined water phase and wash water was extracted with 500 ml. chloroform and the chloroform stripped by heating to 65° C. at aspirator pressure. The stripped material was then distilled under reduced pressure to provide the three cuts which were combined and redistilled at a reflux ratio of 5 to 1, and at reduced pressure. The conditions during distillation and refractive indices are summarized in Table IX.

Table IX

DISTILLATION OF N,N-DIMETHYL-n-BUTANESULFINAMIDE

| Cut No. | Temperature, °C. | | Pressure, mm. | Weight, g. | Refractive Index, $n_D^{20}$ |
|---|---|---|---|---|---|
| | Kettle | Head | | | |
| 1 | 75 | 62 | 0.6 | | |
|   | 81.5 | 65 | 0.4 | 9.7 | 1.4662 |
| 2 | 81 | 63.5 | 0.4 | 10.2 | 1.4666 |
| 3 | 82 | 60 | 0.4 | 25.2 | 1.4666 |
| 4 | 80 | 62.5 | 0.45 | 24.1 | 1.4666 |
| 5 | 80 | 62.5 | 0.45 | 24.2 | 1.4666 |
| 6 | 80 | 62.5 | 0.45 | 24.1 | 1.4666 |
| 7 | 80 | 62.5 | 0.45 | 24.8 | 1.4666 |
| 8 | 80 | 62 | 0.45 | 24.5 | 1.4666 |
| 9 | 94 | 68 | 5.5 | 10.0 | 1.4664 |
| 10 | 114 | 88 | 6.0 | 5.0 | 1.4658 |

Analysis of Cut No. 3:

| | Calculated for $C_6H_{15}NOS$ | Found |
|---|---|---|
| Carbon | 48.3 | 47.6 |
| Hydrogen | 10.1 | 10.2 |
| Nitrogen | 9.4 | 9.6 |
| Sulfur | 21.5 | 20.9 |
| Oxygen | 10.7 | [1] 11.7 |

[1] By difference.

As previously pointed out, the alkanesulfinyl chlorides of the present invention are particularly useful as intermediates for the production of other useful chemical compounds such as the corresponding sulfinamides. The sulfinamides can be used in formulating emulsion polymerization recipes and for compounding rubber, and are especially useful in redox polymerization systems of the sulfoxylate type wherein the sulfinamides can be used as direct substitutes for the sodium formaldehyde sulfoxylate in such systems. Primary and secondary alkanesulfinamides such as N,N-di-n-butylmethanesulfinamide are also useful as synergists for allethrins and pyrethrins in insecticidal compositions as disclosed in U.S. 2,946,715, filed June 23, 1958, Stansbury et al. The alkanesulfinamides are also useful as bird repellents as disclosed in U.S. 2,955,980, filed December 1, 1958, Goodhue et al.

As will be evident to those skilled in the art, many variations and modifications of this invention can be practiced in view of the foregoing disclosure. Such variations and modifications are clearly believed to come within the spirit and scope of the invention.

I claim:

1. A process which comprises reacting in a reaction mass a compound selected from the group consisting of primary and secondary alkylsulfur trichlorides with a stoichiometric proportion of a compound having the characteristic structure ROH, where R is selected from the group consisting of hydrogen and alkyl radicals having from 1–5 carbon atoms, at a temperature below the rapid decomposition temperature of the trichloride to form the corresponding alkanesulfinyl chloride as a principal reaction product of the process.

2. A process which comprises reacting in a reaction mass a compound selected from the group consisting of primary and secondary alkylsulfur trichlorides having the characteristic formula

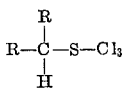

wherein R is selected from the group of hydrogen and alkyl groups of from 1–20 carbon atoms, with a stoichiometric proportion of a compound having the characteristic structure ROH, wherein R is selected from the group of hydrogen and alkyl radicals having from 1–5 carbon atoms, in an inert solvent at a temperature below about 10° C. to form the corresponding alkanesulfinyl chlorides as a reaction product of the process.

3. A process for the production of ethanesulfinyl chloride which comprises contacting ethylsulfur trichloride with water in an amount not to exceed stoichiometric proportions of water to chloride to form sulfinyl chloride, said contacting being effected at a temperature below about 10° C. and in n-pentane, and recovering said sulfinyl chloride as a product of the process.

4. A process for the production of butanesulfinyl chloride which comprises contacting butylsulfur trichloride with water in an amount not to exceed stoichiometric proportions of water to chloride to form sulfinyl chloride, said contacting being effected at a temperature below about 10° C. and in n-pentane, and recovering said sulfinyl chloride as a product of the process.

References Cited by the Examiner

Braun et al.: Chemische Berichte, vol. 56, pages 549–553 (1923).

Poole: "The Preparation and Properties of Certain Sulfinyl Chlorides," Division of Graduate Study, University of Maine, Arono, Maine, June 1956.

NICHOLAS S. RIZZO, *Primary Examiner.*